UNITED STATES PATENT OFFICE.

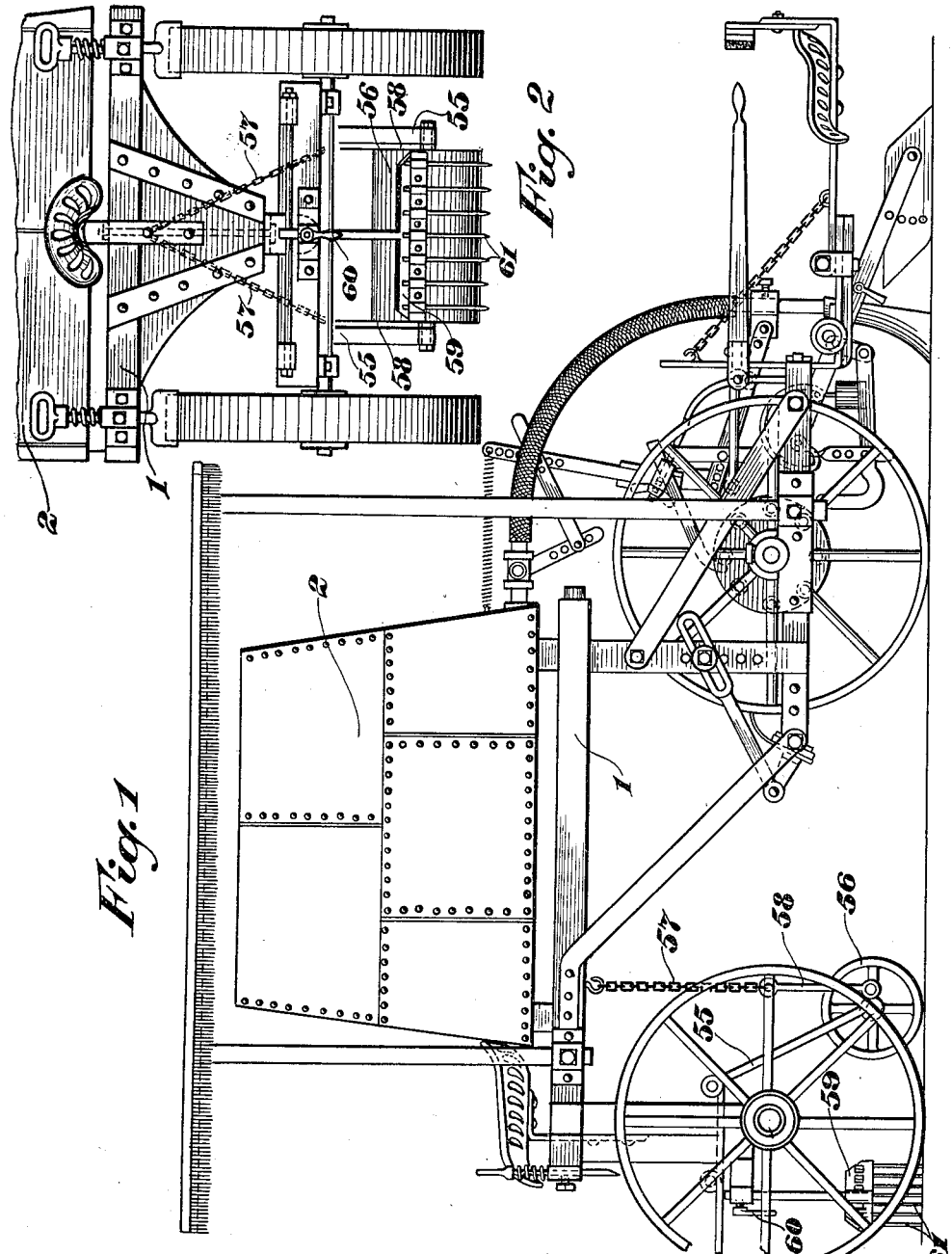

ALBERT LAROSE, OF ST. ESPRIT, QUEBEC, CANADA.

TRANSPLANTING-MACHINE.

997,923. Specification of Letters Patent. Patented July 11, 1911.

Original application filed November 25, 1910, Serial No. 593,984. Divided and this application filed February 27, 1911. Serial No. 611,193.

*To all whom it may concern:*

Be it known that I, ALBERT LAROSE, a subject of the King of England, residing at St. Esprit, in the Province of Quebec, Canada, have invented certain new and useful Improvements in Transplanting-Machines; and I do hereby declare that the following is a full, clear, and exact description of the invention, such as will enable others skilled in the art to which it appertains to make and use the same.

The invention to be hereinafter described relates to planting machines and more particularly to machines for transplanting or replanting.

This application is a division of application Serial Number 593,984 filed Nov. 25, 1910.

In order to more clearly disclose the construction, operation, and use of the invention, reference should be had to the accompanying drawings forming part of the present application.

Throughout the several figures of the drawings like reference characters designate the same parts.

In the drawings: Figure 1 is a side elevation of the invention, applied; and Fig. 2 is a front view.

Referring to the drawings in detail, 1 indicates a main or supporting frame on which the various working parts are mounted or carried. Any suitable form and construction of water tank 2 is mounted on the top of this frame. The axle of the front supporting wheels of the frame, of course, is swiveled thereto. Parallel links 55 connect the front axle with the opposite ends of a packing roller 56 which is suspended from the center of the forward part of the frame, by chains 57 extending to the opposite ends of the roller. Short rigid rods 58 are used for the lower sections or portions of the chains. Whenever the front axle is turned, the tendency will be for the chains 57 to wind up and shorten, thus lifting the roller clear of the ground and preventing injury to plants in adjacent rows, as the machine is turned around.

To level off and rake the earth in front of the machine as it travels, an inclined rake 59 is used. The shank or handle of this rake is vertically adjustable in its bearings and may be held in position by a suitable set screw 60, or the like. The rake comprises a head, handle, and a plurality of independently adjustable rake teeth 61.

Changes may be made in the construction, arrangement, and disposition of the several parts of the invention without in any way departing from the field and scope of the same and it is meant to include all such within this application wherein only a preferred form has been disclosed.

Having thus fully described my invention, what I claim as new and desire to secure by Letters Patent is:

1. In a machine of the character described, a frame, a front axle pivotally mounted in said frame, a roller connected to said front axle, and means for automatically raising said roller whenever said front axle turns from a straight forward direction.

2. In combination, a vehicle frame, an axle swiveled therein, a packing roller, connections between said roller and said axle, and flexible connections between said roller and said frame.

3. In combination, a vehicle frame, an axle swiveled therein, a packing roller, links connecting the opposite ends of said roller with said axle, and flexible connections between the opposite ends of said roller and said vehicle frame above said roller.

In witness whereof I have hereunto set my hand in the presence of two witnesses.

ALBERT LAROSE.

Witnesses:
JOSEPH LAROSE,
JOSEPH LACHAPELLE.

Copies of this patent may be obtained for five cents each, by addressing the "Commissioner of Patents, Washington, D. C."